US011480532B2

(12) United States Patent
Hegstrom et al.

(10) Patent No.: US 11,480,532 B2
(45) Date of Patent: Oct. 25, 2022

(54) INSPECTION, ANALYSIS, CLASSIFICATION, AND GRADING OF TRANSPARENT SHEETS USING SEGMENTED DATASETS OF PHOTOELASTICITY MEASUREMENTS

(71) Applicant: LiteSentry Corporation, Northfield, MN (US)

(72) Inventors: Eric Hegstrom, Tucson, AZ (US); Bryan Nelson, Burnsville, MN (US)

(73) Assignee: LiteSentry LLC, Burnsville, MN (US)

( * ) Notice: Subject to any disclaimer, the term of this patent is extended or adjusted under 35 U.S.C. 154(b) by 943 days.

(21) Appl. No.: 16/246,513

(22) Filed: Jan. 13, 2019

(65) Prior Publication Data
US 2019/0376909 A1  Dec. 12, 2019

Related U.S. Application Data

(60) Provisional application No. 62/681,692, filed on Jun. 7, 2018.

(51) Int. Cl.
| | | |
|---|---|---|
| *G01N 21/958* | (2006.01) | |
| *G01N 21/59* | (2006.01) | |
| *G01B 11/16* | (2006.01) | |
| *G05B 19/418* | (2006.01) | |

(52) U.S. Cl.
CPC ........... *G01N 21/958* (2013.01); *G01B 11/18* (2013.01); *G01N 21/59* (2013.01); *G05B 19/41875* (2013.01); *G01N 2201/126* (2013.01); *G05B 2219/32368* (2013.01); *G05B 2219/45234* (2013.01)

(58) Field of Classification Search
CPC ............... G01N 21/958; G01N 21/59; G01N 2201/126; G01B 11/18; G05B 19/41875; G05B 2219/32368; G05B 2219/45234
See application file for complete search history.

(56) References Cited

U.S. PATENT DOCUMENTS

| | | | | |
|---|---|---|---|---|
| 4,585,343 A | * | 4/1986 | Schave | G01N 21/896 356/613 |
| 4,668,086 A | * | 5/1987 | Redner | G01N 21/23 356/327 |
| 5,400,131 A | * | 3/1995 | Stockley | G01L 1/241 356/365 |

FOREIGN PATENT DOCUMENTS

| | | | | |
|---|---|---|---|---|
| DE | 19511707 A1 | * | 10/1996 | ............. G01L 1/241 |
| WO | WO-9408229 A1 | * | 4/1994 | ............. G01N 21/21 |

* cited by examiner

*Primary Examiner* — David P Porta
*Assistant Examiner* — Fani Polyzos Boosalis
(74) *Attorney, Agent, or Firm* — Edward A. Weck (57) ABSTRACT

An apparatus and methods of inspecting, analyzing, classifying, and/or grading quality of a transparent sheet using a data set of photoelasticity measurements, thickness measurements, segmentation specifications, measurement specifications and quality control specifications of the transparent sheet. A results measurement is calculated on a computing system, quality control specifications are applied to the results measurement allowing writing to the database and creating reports, sending results to an operator interface and machine control.

14 Claims, 10 Drawing Sheets

INSPECTION, ANALYSIS, CLASSIFICATION, AND GRADING OF TRANSPARENT SHEETS USING SEGMENTED DATASETS OF PHOTOELASTICITY MEASUREMENTS

BENEFIT OF PRIORITY

This application claims the benefit of priority of prior filed U.S. Application Ser. No. 62/681,692 filed Jun. 7, 2018, which is herein incorporated by reference in its entirety.

BACKGROUND OF THE INVENTION

Description of the Related Art

Photoelastic experiments (also informally referred to as photoelasticity) may be used to determine stress concentration in transparent materials. The photoelastic phenomenon was first discovered by the Scottish physicist David Brewster circa 1815 and since then many apparatuses and methods have been created to take advantage of this phenomenon.

Manufacturers of transparent sheet products such as glass, polycarbonate, acrylic and similar materials are concerned with optical quality and mechanical quality of these products. Fabrication processes employed to form, cut, heat-strengthen, laminate, coat, machine, and mount into frames the transparent sheet can cause stresses on the transparent sheet. Stress may be applied intentionally through a heat treatment or tempering process to increase strength and improve safety characteristics. The control of stress induced by a heat treatment process is critical in maintaining acceptable optical and structural quality of the finished sheet, and in optimizing yield through the heat treatment process. Such stresses may be beneficial, when applied in the intended manner. Unintended or inappropriate application of stresses to the transparent sheet can result in poor optical quality, poor physical quality, breakage, and failure or rejection by the end user after the product is deployed. Flatness is a structural quality required for most processor of transparent sheet. Maintaining flat planar sheets is critical to achieving the quality expected by the end user. Photoelasticity is often employed in the manufacturing and quality assurance process to measure these properties quickly and accurately in a non-destructive manner.

Historically the amount of time required from order to delivery of fabricated glass products was many weeks or months. With the luxury of time, batches could be organized such that the glass was heat treated in large batches of similar products, allowing operators to optimize the process to achieve relatively consistent results. Current glass fabrication plants turn finished products rapidly from order to delivery, often in less than 24 hours. This fast turn, pull manufacturing environment necessitates frequent changes in the heat treatment process, with single loads run at a single recipe, followed by a load of a different product at a different recipe. A recipe is a set of heating and quenching/cooling parameters controlling the process. The loads passing through the heat treatment process consist of single or multiple glass sheets ranging in size from less than 0.25 m$^2$ to greater than 25 m$^2$. With frequent and significant changes to the heat treatment process recipe in short time spans, the control of the process is difficult. The purpose of the tempering of glass is to strengthen the glass by introducing stresses into the glass. The stress is described as tensile in the center of the glass sheet and compressive at all the outside surfaces. The ideal make-up of a fully tempered sheet of glass is a uniformly balanced stress profile of a central tensile layer of approximately 58% of thickness sandwiched between top and bottom layers in compression, each of approximately 21% of total thickness. This idealized stress balance is difficult to achieve in practice, as the variables within the heat treatment process and frequent changes to the process result in highly variable distribution of stress in the glass. These variations in stress distribution are due to variations in fabrication prior to tempering, sheet geometry, heating, quenching, cooling, conveyance, support and other inputs. The compressive and tensile internal stresses in any single sheet of heat treated glass must be balanced. Excessive compressive stresses in one area must be balanced by tensile stresses in adjacent areas for the sheet to remain intact and in the shape intended. For these reasons, large area, rapid and high resolution measurement, inspection, analysis, classification and grading of stress in the full glass sheet is critical for controlling the process and maintaining acceptable quality.

Typically the inspection methods and apparatus used to measure stress in glass involve projecting light of a single or plurality of polarization states, through a transparent material and analyzing the light transmission by viewing it through a single or plurality of polarizing filters. Often the image is digitized and some technique is used to unwrap the moiré fringe pattern into a retardance map. A knowledgeable operator may learn the art of interpreting the shape, image texture, and amplitude of the retardance map to assess the material under test for specific mechanical deformation, physical non-planarity or lack of flatness, incorrect shape, optical strain marks objectionable to the observer, or a residual stress state that may lead to weakness in the transparent sheet. Until now it has been difficult to analyze this retardance map in an automated fashion. The magnitude and orientation of optical retardance as well the orthogonal shear components know as Shear 0 and Shear 45 are described in Reforming Photoelastic Concepts by Lesniak, et al., http://www.bssm.org/uploadeddocuments/Conference%202016/2016%20papers/3-la_Lesniak.pdf. All of the references and patents are fully incorporated by reference.

Uneven distribution of stress in the glass leads to visible strain patterns or iridescence when viewed in certain daylight conditions. Iridescence is a ghost-like pattern of haze or contrasting light and dark areas in the glass. White haze is another term for contrasting light and dark areas in the glass and can result from both strain patterns in the glass and physical scuffing or abrasion on the bottom surface of the glass. Haze is defined for this writing as including strain patterns, iridescence, white haze, heat stain, or belly banding. The end users including architects and building owners are increasingly dissatisfied with haze, strain patterns or iridescence in glass. It is deemed a valuable and highly useful benefit to detect inspect, analyze, classify and grade strain pattern or iridescence in glass during the fabrication process and prior to installation into window frames and buildings, thereby avoiding the high cost of replacing defective windows after installation.

Glass fabrication is a high throughput operation with batches of glass sheets typically entering the heat treatment process every thirty seconds to fifteen minutes. A glass heat treatment system requires constant monitoring and adjustment as products and load size vary. The real-time measurement of stress in glass is critical for the successful control of the glass heat treatment system. Feedback for the control of the glass heat treatment system must occur within seconds of the measurement of stress in preceding sheets, in order to make adjustments and maintain suitable quality including low levels of iridescence.

Current means of measurement include transmissive polariscopes and grazing angle surface polariscopes. These devices are limited to small spot size measurements. Small spot size of measurements and small number of samples per sheet of glass provide insufficient coverage to characterize the entire part.

Other current means of measuring the stress distribution involve mounting of transparent sheets onto a test platform and the scanning of the sheets using an x-y robot or similar material handling machinery to collect an array of data points. The process is time and labor intensive, requiring tens of minutes or hours to measure the array of sample points on a single sheet. This device requires the manual input of thickness.

The most widely used method of testing for stress in heat treated glass is destructive in the form of a break test after heat-treatment. The break test is required by various national and international codes, and involves choosing a representative sample from a batch of glass sheets being processed through heat treatment, breaking the sheet in a prescribed manner using a prick punch, and isolating and counting specific broken fragments. Break tests offer only a very course idea of the stress distribution and only to a highly experienced operator. Recording the results of a break test requires the manual input of thickness. Break testing of heat treated glass results in 1% to 3% yield loss to the heat treated glass industry. Hundreds of pieces are often processed between break tests with no data collected on the parts processed between break tests to define stress levels and quality of the tempered glass. Shortcomings of the process include the lack of quantified stress measurements and the lack of a check of optical quality.

Systems for measuring photoelastic stress in glass such as described in Redner (U.S. Pat. No. 4,668,086) and Stockley (U.S. Pat. No. 5,400,131) are limited in practice to very small sample spot sizes of 1 square cm or less. Devices described in these patents are manual or semi-automated and apply to spot sampling on sheets of glass. The use of said devices is time consuming. Systems intended to measure large areas of glass have proven to operate slower than the application requires, requiring tens or hundreds of minutes to measure a single sheet, and often are not able to measure retardation greater than half the wavelength of the light source (or about 230 nm maximum in the case of blue light) The shortcomings of these earlier systems include the lack of ability to resolve the typical retardance range of heat treated glass which may exceed 500 nm, and the very small sample size relative to the very large surface area of the glass.

The actual thickness of the glass is required to calculate residual stress. Systems intended to measure large areas of glass require human operator input of nominal thickness approximated to the nearest millimeter, leading to two types of errors: a nominal thickness entry is only an estimate of actual thickness; and human data entry is prone to error. The accurate determination of localized stress requires actual material thickness.

Droste, et al. describe a method in DE 195 11 707 A1 for determining stresses in transparent materials, especially glass, in which polarized light is passed through the material and the emerging light beam is analyzed such that the birefringence due to stresses in the material changes the polarization state of the light beam, with the intensity of two perpendicular polarizations components of the light beam measured simultaneously and independent of one another. The method provides two polarization states at a single wavelength source of light. Though useful, this method lacks the additional two polarization states, for a total of four polarization states, required to fully define stress maps, shear maps, stress direction and iridescence maps. However, apparatus are currently commercially available that collect four polarization states at three wavelengths, thereby providing the full data set of photoelasticity measurements envisioned for use by this invention. Sources of such systems include LiteSentry Corporation of Minnesota USA and Ilis of Erlangen Germany.

Gawrisch, et al. describe in U.S. Pat. No. 4,692,026 an apparatus for the continuous determination of the state of anisotropy of an optionally active material comprising a light source, a polarizer, a compensating wedge, an analyzer, means for photosensitive scanning of said analyzer wherein the optically visible transmission from said analyzer is scanned as a function of its point-wise brightness, and a computer. The invention teaches the use of fringe detection as a qualitative means of determining the physical properties of the substrate. The shortcoming of this method is the lack of high resolution data collection of retardance in nm, and in the analysis of discrete areas of the sheet such that maps of the sheet may be created and visualized. The present invention envisions us of data of resolution of less than one square millimeter of the sheet, as is commercially available.

Barry, et al. describe in WO 1994008229, a method of detecting stress-inducing inclusions in tempered glass, comprising the steps of illuminating the glass with polarized light; viewing the illuminated glass through a polarizing medium whose plane of polarization is orientated orthogonally to the plane of polarization of the illumination; and detecting localized stress patterns in the glass indicative of the inclusions.

There is, therefore, a need to measure large areas of translucent or transparent products quickly and over large values of retardation (typically over 500 nm). Additionally there is a need for quantifying, comparing and grading these measurements including the ability to quantify and grade the quality of the sheet for bow, warp, bi-stability, saddle bow, inclusions such as Nickel sulfide, haze, strain marks and other physical or optical defects.

SUMMARY OF THE INVENTION

The apparatus and method in accordance with the present inventions may resolve many of the needs and shortcomings discussed above and will provide additional improvements and advantages The present invention relates to an apparatus and a method to inspect, analyze, classify, and grade the quality of transparent sheets using statistical analysis of various segmentations of data sets of optical measurements including optical retardance, shear, and stress axis orientation or azimuth over the area of the part being tested. The production of transparent products are typically composed of glass, plastic, polycarbonate, or acrylic—although this invention is not limited to those materials. Statistics are generated for the various areas of these segmented maps and mathematical and logical combinations of the statistics of the segments can be directly correlated to physical and optical characteristics.

The preferred embodiment includes a computing system capable of inputting, segmenting, and analyzing a data set of photoelasticity measurements which typically includes: magnitude and orientation of optical retardance as well as the orthogonal shear components known as Shear 0 and Shear 45, a thickness sensing device for measuring and inputting the actual thickness of the transparent sheet thereby allowing residual stress to be computed from the retardance data, display and storage components to display the results to a machine operator and to store critical data and results from the statistical analysis for later retrieval and use. The included data elements described are collected and provided in a two dimensional spatial matrix covering the transparent sheet and typically resolved to less than one square millimeter area. Each square area includes all the data elements with all the areas encompassing the sheet comprising the data set for the transparent sheet. Commercially available systems to measure photoelasticity at this resolution are available from LiteSentry Corporation of Minnesota USA, Stress Photonics of Wisconsin USA and Ilis of Germany, and possibly others.

Automated Thickness Measurement of Actual Thickness

Non-contact thickness sensors positioned above or below the glass dynamically measure the actual thickness of the moving glass as retardation is simultaneously measured by the optical retardance measurement system. With real time and actual measurement of the material thickness at the point of the retardance measurement, localized material stress can be calculated using the stress-optical constant of the glass.

Thickness measurement devices utilizing monochromatic light and triangulation of reflections from the top and bottom surface of the glass are utilized in the preferred embodiment. Other thickness sensing devices could be used including contact probes, ultrasonic sensors, and optical sensors.

Segmentation Specification

A segmentation specification is a specification on how a transparent sheet is segmented. This specification may be arbitrarily complex. The segmentation specification can be either defined with graphical areas or by critical parameters controlling the segmentation. An arbitrary list of segmentation specifications may be supplied. A segmentation specification may also be selected from an existing library of segmentation specifications. A segment may include the entire transparent sheet, including the width, length, area and aspect ratio. A segmentation specification may by limited to sheets of particular geometry, area, thickness or aspect ratio. Multiple unique segmentation specifications may be applied to unique sets of sheets with particular geometry, area, thickness or aspect ratio.

Measurement Specification

A measurement specification is a mathematical function applied to single segments or a plurality of segments with the possible addition of Boolean logic functions such as "and", "or" "not- or" or "exclusive or". An arbitrary list of measurement specifications is supplied. A measurement specification may also be selected from an existing library of measurement specifications. Any statistical and mathematical functions or operations may be defined including spatial image analysis including pattern recognition, feature identification and classification as well as frequency and texture analysis.

Quality Control Specification

A quality control specification is a limit on a measurement or plurality of measurements and a specific action to perform based on the results. An arbitrary list of quality control specifications is supplied. Some examples of quality control specifications are listed below though it is not limited to these. A quality control specification may also be selected from an existing library of quality control specifications.

Machine Control

Machine Control is a system for sending a signal from the computing system to the fabrication or heat treatment machinery upstream of the inspection process, the signal to be used by the machinery to adjust the process to correct for unacceptable quality in the transparent sheet. The system could comprise a single or multiple outputs to trigger functions in the machinery, or it could include a series of software commands to be received and interpreted by the machinery to improve the processes to improve the quality of the transparent sheet after processing.

The current method improves on the prior art in its ability to measure large areas quickly and over large values of retardation (typically over 500 nm). The current system and methods measure optical retardance over large areas to define the level and range of stress patterns and variation of the patterns. Additionally the current method provides a method for quantifying, comparing and grading measurements including the ability to quantify and grade the quality of the sheet for bow, warp, bi-stability, saddle bow, inclusions such as Nickel sulfide, haze, strain marks and other physical or optical defects.

BRIEF DESCRIPTION OF THE DRAWINGS

All Figures are illustrated for ease of explanation of the basic teachings of the present invention only; the extensions of the Figures with respect to number, position, relationship and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

DETAILED DESCRIPTION OF THE INVENTION

This invention describes an apparatus and methods for inspecting, analyzing, classifying, and grading the quality of transparent sheets using statistical analysis of various segmentations of a data set of photoelasticity measurements, segmentations A-H, see FIGS. 1-9. Statistics are generated for the various areas of the segmented data set of photoelasticity measurements and mathematical and logical combinations of the statistics of the segments can be directly correlated to physical and optical characteristics.

Figure 1:
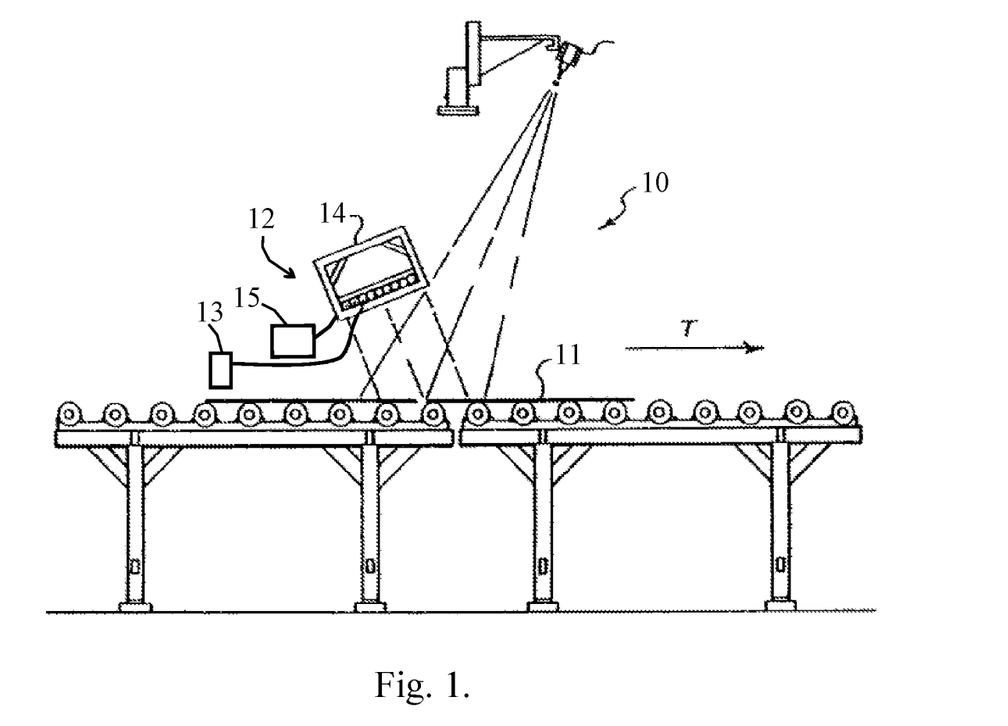
FIG. 1 of the drawings shows a diagram of an apparatus for inspection of transparent sheets using segmented maps of photoelasticity measurements.
Figure 2:
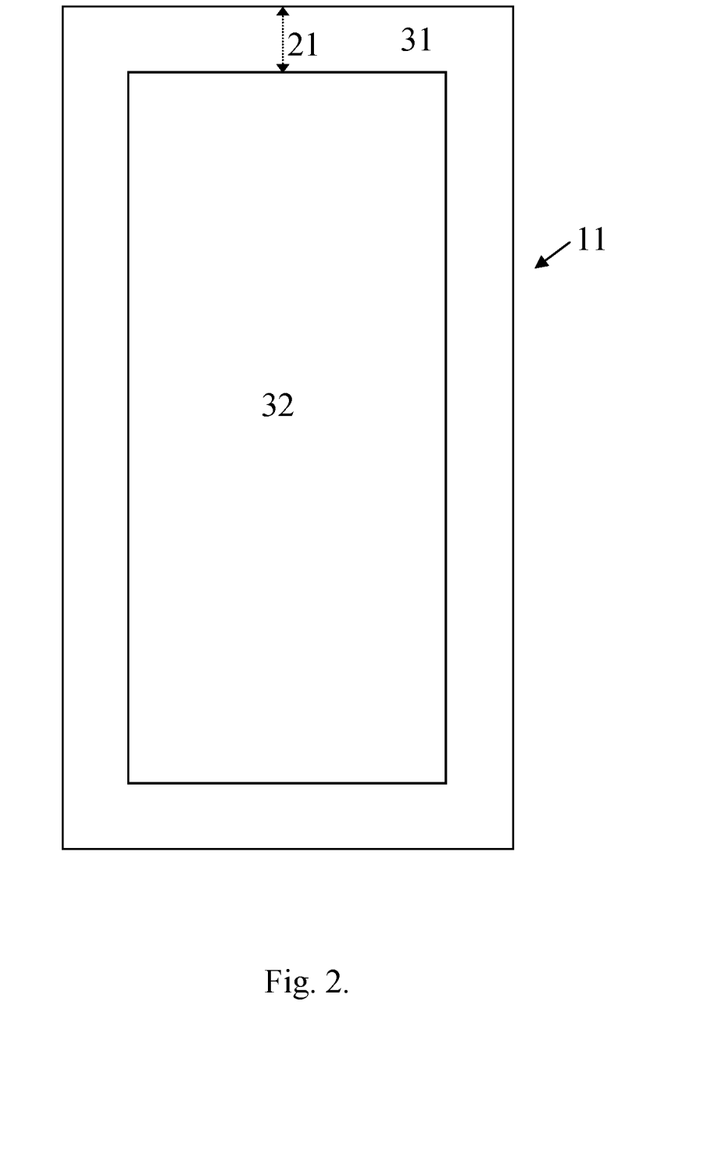
FIG. 2 of the drawings shows a diagram of segmentation specification A.

A preferred embodiment of the apparatus 10 includes: a computing system 12 capable of inputting, segmenting, and analyzing spatial maps of retardance; a thickness sensor 13 for measuring and inputting the actual thickness of the transparent sheet 11 thereby allowing residual stress to be computed from the retardance data; a display device 14 to display the results to a machine operator; and a storage device 15 and to store critical data and results from the statistical analysis for later retrieval and use, see FIG. 1. The direction of the production stream is shown with letter T in FIG. 1.

Definitions

Segmentation Specification

The examples below are of segmentation specifications for use with a transparent sheet. These examples are not exhaustive and other segmentation specifications are possible.

The examples below are of possible segmentation specifications. Parameters for the segmentation specifications included are: edge width, ew, 21; strip height, sh, 22; strip width, sw, 23; length edge width, lew, 24; corner area, ca 25; side edge width, sew, 26; central oval area, coa, 27; and perimeter ring, pr, 28.

Segmentation Specification A—A simple segmentation of the transparent sheet 11 into an inner and outer area. This is useful for measuring total levels of retardation and residual stress in the center 32 of the transparent sheet 11 and the edge 31 of the transparent sheet, see FIG. 2. The transparent sheet is segmented into two segments (A1-31, A2-32) based on the parameter edge width 21.

Figure 3:
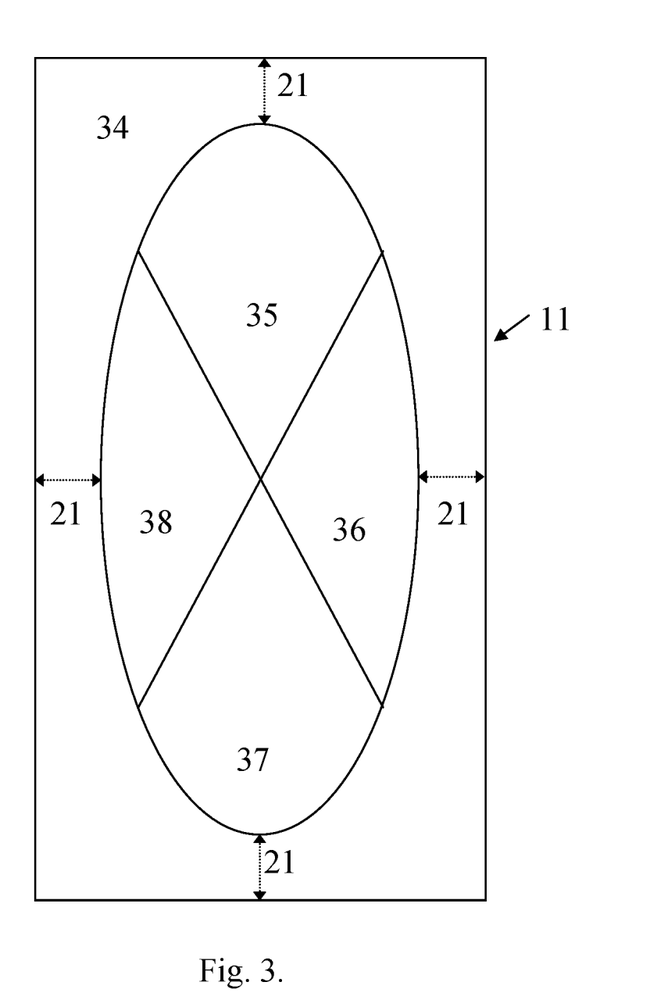
FIG. 3 of the drawings shows a diagram of segmentation specification B.
Figure 4:
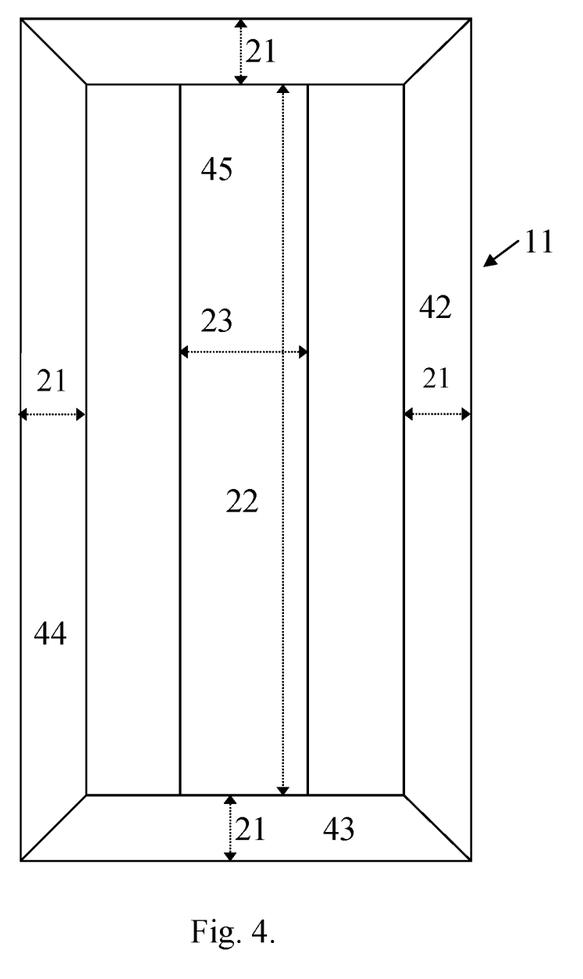
FIG. 4 of the drawings shows a diagram of segmentation specification C.
Figure 5:
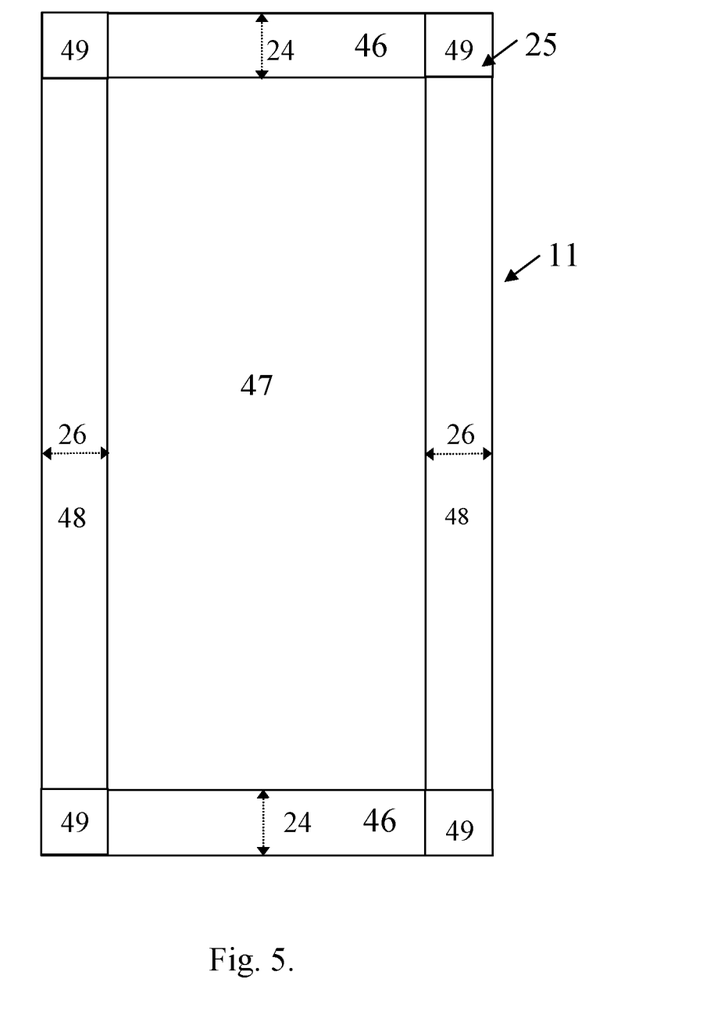
FIG. 5 of the drawings shows a diagram of segmentation specification D.

Segmentation Specification B—This is a more complex segmentation of the transparent sheet 11 allowing analysis of quadrants of the central area (B2-35, B3-36, B4-37, B5-38) versus the annular ring (B1-34), see FIG. 3. The transparent sheet is segmented into five segments (34, 35, 36, 37, 38) based on the parameter edge width 21.

Segmentation Specification C—A segmentation often useful for determining asymmetrical stress causing bow or warp in the sheet 11. The center segment 45 is used for analyzing haze or "white haze" or "heat stain" or "belly band" in heat treated glass, see FIG. 4. The transparent sheet 11 is segmented into five segments (C1-41, C2-42, C3-43, C4-44, C5-45) based on the parameters edge width 21, strip height 22 and strip width 23.

Segmentation Specification D—A segmentation of the transparent sheet 11 into an inner area 47 and outer area 46, 48 plus corners 49. This allows analysis of corner stresses separately from center and edges, see FIG. 5. The transparent sheet 11 is segmented into nine segments (D1-46, D2-47, D3-48, D4-49) based on the parameters length edge width 24, corner area 25, and side edge width 26

Figure 6:
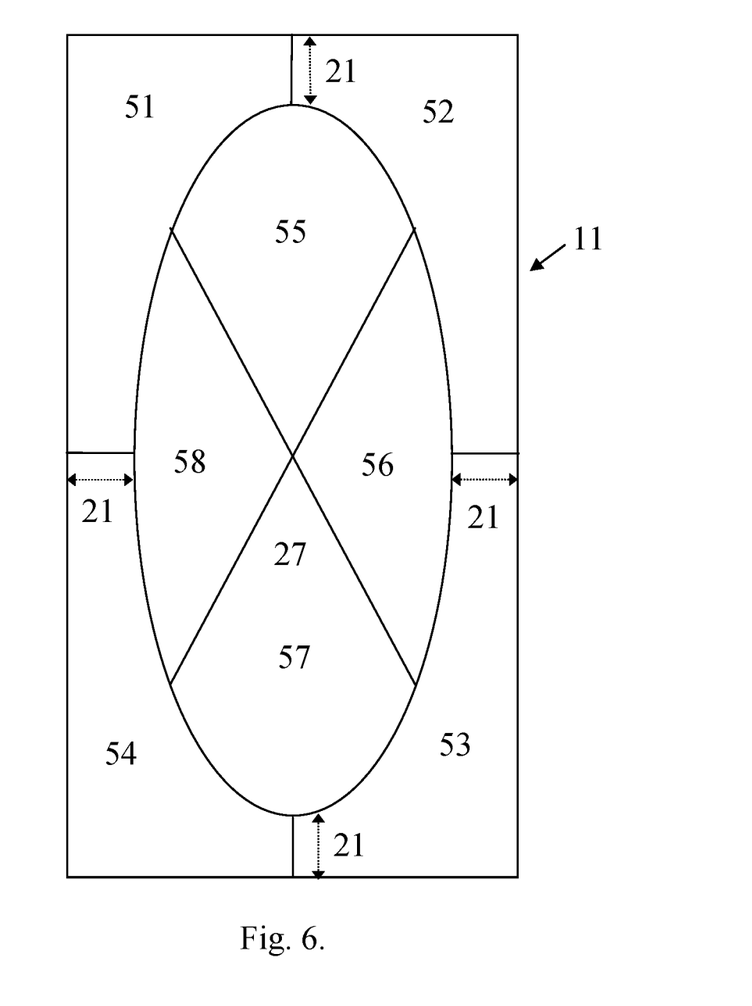
FIG. 6 of the drawings shows a diagram of segmentation specification E.

Segmentation Specification E—A segmentation of the central area and corners into quadrants, both in center and in annular space, see FIG. 6. The transparent sheet 11 is segmented into eight 8 segments (E1-51, E2-52, E3-53, E4-54, E5-55, E6-56, E7-57, E8-58) based on the parameters: edge width 21 and central oval size 27.

Figure 7:
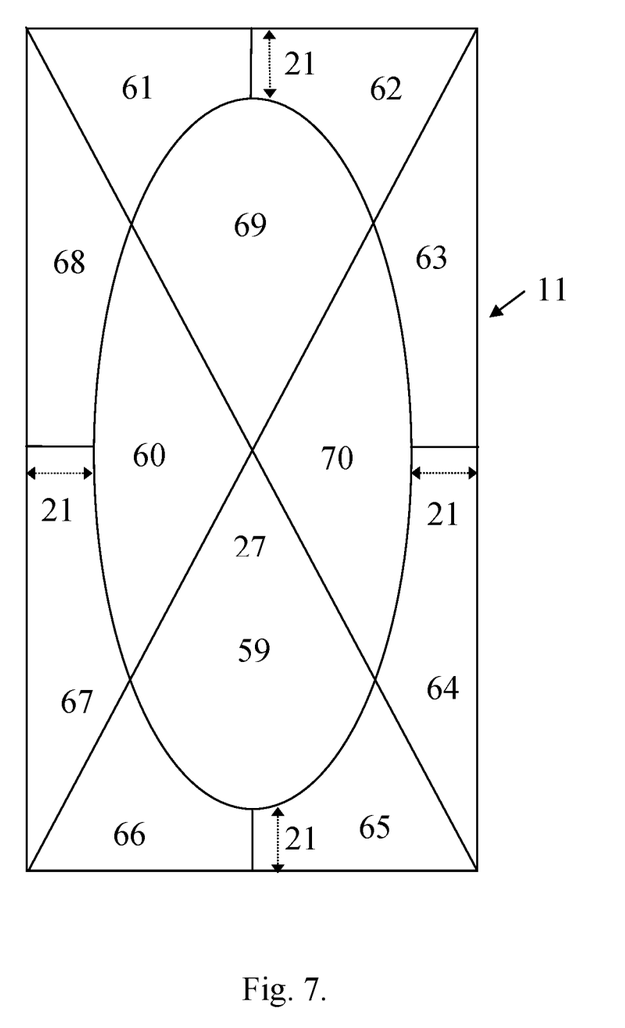
FIG. 7 of the drawings shows a diagram of segmentation specification F.

Segmentation Specification F—Segmentation of the central area and corners into quadrants, and further bisected by diagonals, see FIG. 7. The transparent sheet 11 is segmented into segments (F1-61, F2-62, F3-63, F4-64, F5-65, F6-66, F7-67, F8-68, F9-69, F10-70, F11-59, F12-60 based on the parameters: edge width 21 and central oval size 27

Figure 8:
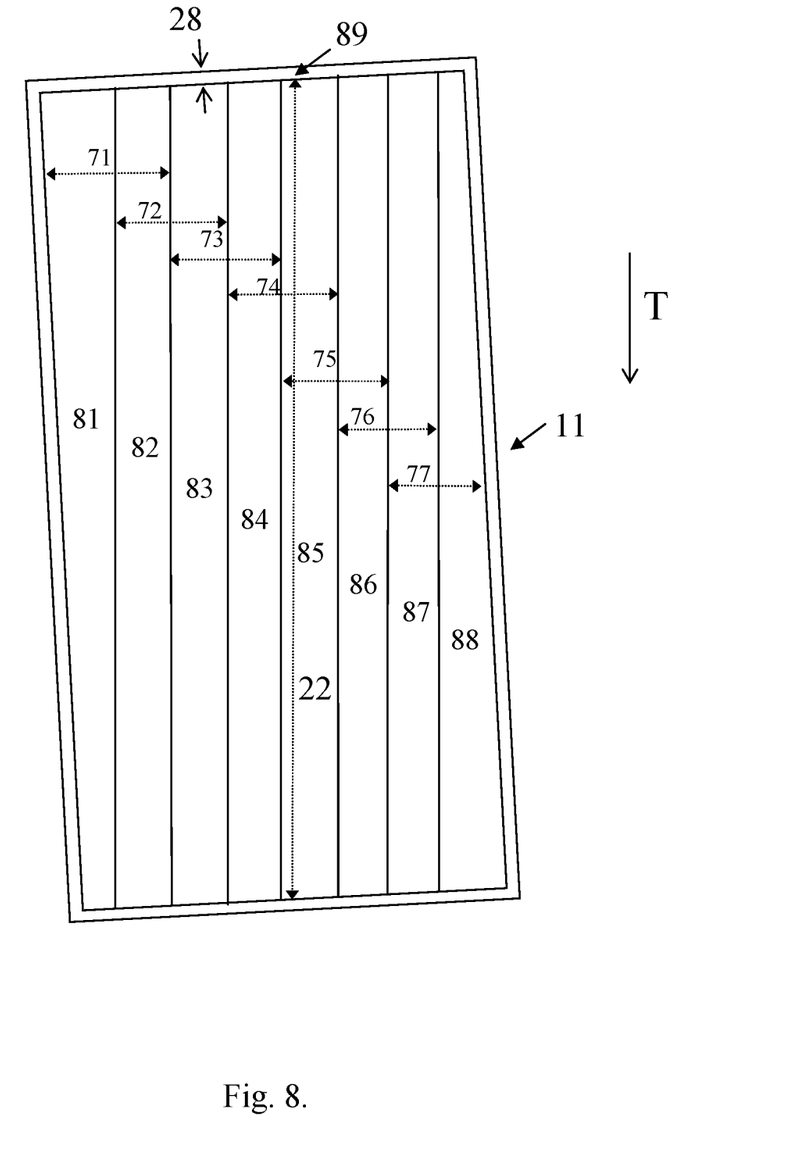
FIG. 8 of the drawings shows a diagram of segmentation specification G.

Segmentation Specification G—Segmentation of the transparent sheet into multiple strips that are run parallel to the direction of travel of sheet through process, separated from a perimeter ring, see FIG. 8. The transparent sheet 11 is segmented into eight segments (81, 82, 83, 84, 85, 86, 87, 88) based on the parameters: perimeter ring width 28, strip height 22, and strip widths (71, 72, 73, 74, 75, 76, 77).

Figure 9:
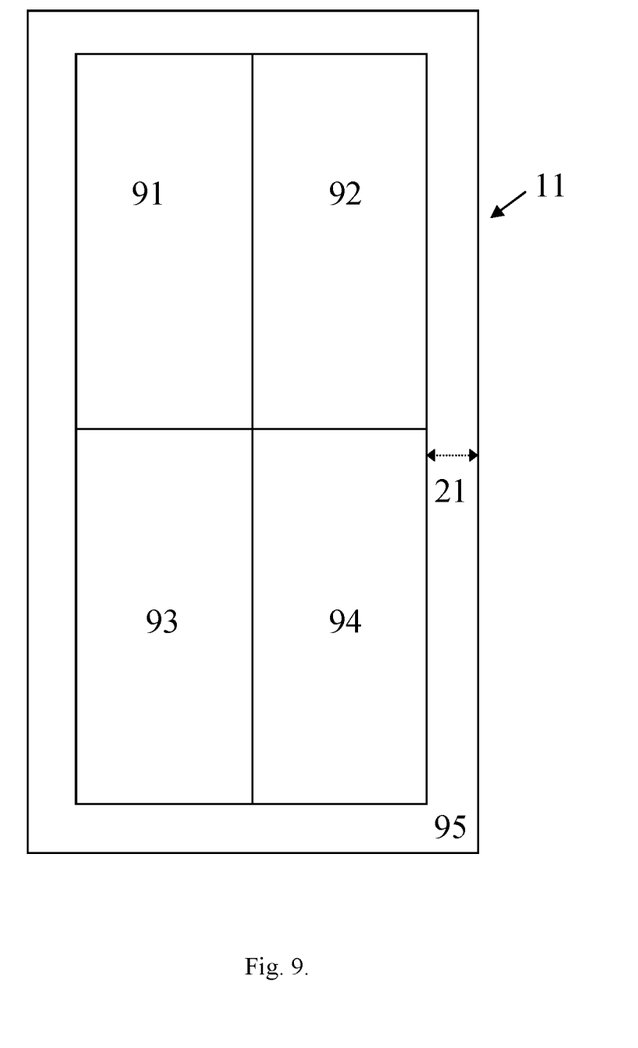
FIG. 9 of the drawings shows a diagram of segmentation specification H.

Segmentation Specification H—Segmentation of the transparent sheet into four quadrants (91, 92, 93, 94), separated from a perimeter ring 95, see FIG. 9. The transparent sheet 11 is segmented into five segments (91, 92, 93, 94, 95) based on the parameter edge width 21.

Measurement Specification

A measurement specification is a mathematical function applied to single segments or a plurality of segments with the possible addition of Boolean logic functions such as "and", "or" "not- or" or "exclusive or". Any statistical and mathematical functions or operations may be defined including spatial image analysis including pattern recognition, feature identification and classification as well as frequency and texture analysis. Some typical functions are described in examples below but are not limited to these:

90P(S)—the 90th percentile retardance measurement, or the smallest value such that 90% of the retardance measurements in segment S are less than or equal to this.

AVG(S)—the mathematical average retardance of all measurements in segment S.

ABS(x)—the absolute value of x.

RANGE(x1, x2, x3, x4, . . . , xN)—returns the absolute range of all elements x1 through xN MAX (x, y)—the maximum of the values x and y.

RMS—compute the Root Mean Square roughness of the image texture

Area—area of part (transparent sheet)

Thickness—the thickness of the part (transparent sheet)

AspectRatio—Aspect Ratio of the part (long edge length divided by short edge length)

ShortSideLength—the length of the shorter dimension—the minimum of the length and width The following are examples of some possible measurement specifications. Measurement definitions may be arbitrarily complex and are not limited to these:

Define a Measurement named "M1" as a measurement that is the 90% percentile retardance measurements in the center segment A2 of Segmentation Specification A. This means 90% of the retardance measurements in A2 are less than or equal to M1. This can be written simply as:

$$M1=90\% \text{ percentile of}(A2)$$

or more simply as $$M1=90P(A2)$$

M1 can be used to grade the overall level of retardance in the center of a transparent sheet.

Define a Measurement named "M2" as a measurement that is the maximum of average absolute retardance ratios of edges mirrored across 2 axes. For this test, the segments in Segmentation Definition C are used $$M2=\text{MAX}((\text{ABS}(\text{AVG}(C2)/\text{AVG}(C4)),(\text{ABS}(\text{AVG}(C3)/\text{AVG}(C3))))$$

M2 can be used to grade the retardance mismatch between edges which often directly correlates to the overall level of transparent sheet deformation which is a property that is often desired to be controlled in a manufacturing environment.

Another useful measurement is the comparison of specific shear component quadrant means using segmentation similar to the Segment Definition G, see FIG. 7. The measurement, referred to as M3, could be as simple as computing the range of quadrant segment means like:

M3=RANGE(AVG(G1),AVG(G2),AVG(G3),AVG(G4))

It is found in practice that when applied to one of the orthogonal shear components, commonly referred to as "Shear 0", measurements such as M3 are useful in predicting physical deformation. It has been observed that larger values of M3 correlate to parts that are more likely to demonstrate undesirable warping from planar or lack of flatness.

Another useful measurement is the comparison of absolute retardation variations along the different edges of the part using segmentation similar to the Segment Definition C, see FIG. 3. The measurement, referred to as M4, could be as simple as computing the range of quadrant segment means like:

M4=RANGE(AVG(C1),AVG(C2),AVG(C3),AVG(C4))

It is found in practice that measurements such as M4 are also useful in predicting physical deformation.

Quality Control Specification

Examples of quality control specifications, including test limits and specified actions, are below:
QC1: If M1>100 nm THEN Notify "Check Process—Large Center Retardance"
QC2: If M1>150 nm THEN Notify "Adjust Process—Excessive Center Retardance"
QC3: If M1>150 nm THEN Signal Offload Conveyor
QC4: If M3>30 nm THEN Notify "Possible Part Warp—check overall bow"
QC5: If M3>60 nm THEN Notify "Possible Excessive Part Warp—check overall bow"
QC6: If Thickness <8 mm AND M3>60 nm THEN Signal Offload Conveyor
QC7: If Thickness >=8 mm AND M3>80 nm THEN Signal Offload Conveyor
QC8: If Area >2 m² AND M3>60 nm THEN Signal Offload Conveyor
QC9: If AspectRatio <1.5 AND M3>60 nm THEN Send Automatic Control to oven to adjust time and/or temperature The quality control specifications QC1, QC2, QC4, and QC5 signal to the operator that the levels for retardance are noteworthy and process parameters may need to be adjusted. QC3, QC6, QC7 and QC8 signal an automated system to remove the transparent sheet from the production stream. QC9 sends a closed-loop feedback control to the furnace to adjust processing parameters such as, but not limited to, heating and quench temperatures and duration.

Automated Thickness Measurement of Actual Thickness

Non-contact thickness sensors 13 positioned above or below the transparent sheet 11 dynamically measure the actual thickness of the moving sheet 11 as retardation is simultaneously measured by the cameras. With real time and actual measurement of the material thickness at the point of the retardation measurement, localized material stress can be calculated using the stress-optical constant of the glass.

average stress=$(\Delta * G)/(t * k)n$ where $\Delta$=retardation in nm
G=Stress Modulus in Gpa (approximately 29.5 for float glass)
t=glass thickness in meters
k=strain-optic co-efficient(approximately 0.152 for float glass)

Thickness measurement devices utilizing monochromatic light and triangulation of reflections from the top and bottom surface of the glass are utilized in the preferred embodiment. Other thickness sensing devices could be used including contact probes, ultrasonic sensors, and optical sensors.

Figure 10:
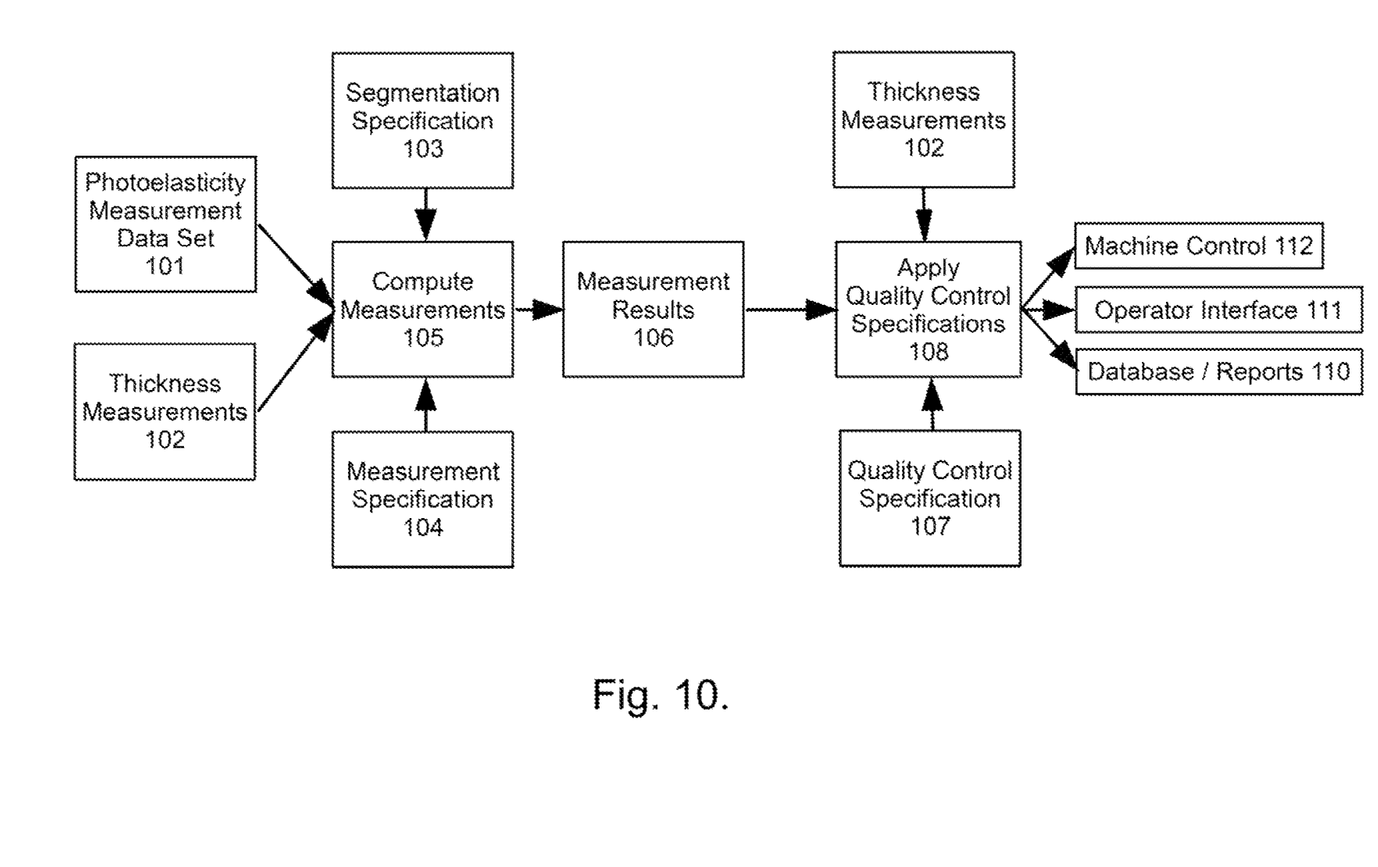
FIG. 10 of the drawings shows a flow chart of analysis of photoelasticity measurements.

A computing system is provided with a data set of photoelasticity measurements 101, actual thickness measurement for a transparent sheet of glass 102, a segmentation specification 103 and a measurement specification 104, as shown in FIG. 10. The data set of photoelasticity measurements typically includes: magnitude and orientation of optical retardance as well as the orthogonal shear components known as Shear 0 and Shear 45. The thickness measurements 102 of actual thickness of the moving transparent sheet 11 are measured by non-contact thickness sensors 13. The computing device computes measurements 105 to provide measurement results 106 such as the results of measurements M1 through M4. Quality control specifications 107 and thickness measurement 102 are applied 108 to the measurement results 106. Specific actions such as writing to the database and creating reports 110, sending results to an operator interface 111 and machine control 112 are specific actions carried out based on test limits.

This invention describes a method of inspecting, analyzing, classifying, and/or grading quality of a transparent sheet 11 comprising: providing a data set of photoelasticity measurements 101 of the transparent sheet 11, comprising a magnitude of optical retardance, an axis orientation of optical retardance, a magnitude of residual stress, an axis orientation of residual stress, and the underlying orthogonal shear components; defining segmentation specifications 103 of the transparent sheet 11, with each segmentation specification 103 segmenting spatially the data set of photoelasticity measurements 101 into a plurality of discrete segments, see FIGS. 2-9; defining measurement specifications 104 of the transparent sheet 11, with each measurement specification 104 applying a mathematical, statistical or logical operation upon a single or plurality of discrete segments; defining quality control specifications 107 of the transparent sheet 11, with each quality control specification 107 defining a test limit applying to a single photoelasticity measurement 101 or a plurality of photoelasticity measurements 101 and defining a specified action depending on the test limit; calculating a results measurement 105 by combining a segmentation specification 103 and a measurement specification 104; applying a quality control test limit on the results measurement 106 using a quality control specification 107 and thickness measurement 102 resulting in a quality control test result; and performing the specified action depending upon the quality control test result.

The method of this invention defines a list of segmentation specifications 103 includes selecting the list of segmentation specifications 103 from an existing library of segmentation specifications 103, defining a list of measurement specifications 104 includes specific selecting the list of measurement specifications 104 from an existing library of measurement specifications 104 and defining a list of quality control specifications 107 selecting the list of quality control specifications 107 from an existing library of quality control specifications 107.

The method of this invention further comprising providing a thickness measurement obtained from a thickness sensor; wherein calculating the results measurement further includes the thickness measurement and wherein applying the quality control test limit further includes the thickness measurement.

The method of this invention wherein the quality control specification 107 includes Boolean logic functions such as "and", "or" "not- or" or "exclusive or".

The method of this invention wherein the data set of photoelasticity measurements 101 and a segmentation specification C and a measurement specification M2 allows predicting the magnitude of deformation from planar of the transparent sheet 11.

The method of this invention wherein using orthogonal shear components allows predicting the magnitude of deformation from planar in the transparent sheet 11.

The method of this invention further defining the segmentation specification 103 of the transparent sheet 11 into four discrete segments, or quadrants, allowing predicting the magnitude of deformation from planar in the transparent sheet 11.

The method of this invention utilizing the data set of photoelasticity measurements 101 in predicting the magnitude of defects including haze in the transparent sheet 11.

The method of this invention utilizing the axis orientation of optical retardance in predicting the magnitude of defects including haze in the transparent sheet 11.

The method of this invention using the orthogonal shear components in predicting the magnitude of deformation including haze or strain patterns or iridescence in the transparent sheet 11.

The method of this invention further defining the segmentation specification 103 of the transparent sheet 11 into a sample center and outer areas and using this segmentation in predicting the magnitude of defects including haze in the transparent sheet 11.

The method of this invention wherein performing the specified action includes removing the transparent sheet 11 from the production stream (direction T in FIG. 1) and adjusting process parameters.

This invention describes an apparatus 10 for inspecting, analyzing, classifying, and/or quality grading of a transparent sheet 11 comprising: a data set of photoelasticity measurements 101 selected from the group consisting of any or all of the following: optical retardance magnitude and orientation, and the orthogonal shear components typically referred to as Shear 0 and Shear 45, stress axis orientation, stress map and maximum predicted iridescence over the area of the transparent sheet 11; a computing system 12; a thickness sensor 13 connected to the computing system 12, and measuring and outputting a thickness 102 of the transparent sheet 11 to the computing system 12; a display device 14 connected to the computing system 10 12; and a storage device 15 connected to the computing system 12, wherein the computing system 12 uses the data set of photoelasticity measurements 101, and the thickness of the transparent sheet 11 from the thickness sensor 13 to calculate and output to the display device 14 a maximum potential iridescence, a retardation and a residual stress over a full area of the transparent sheet 11.

The apparatus of this invention wherein the computing system 12 calculates measurement results 106 and presents the results on the display device 14 including maps of iridescence, retardance, residual stress, and shear over the full area of the transparent sheet 11, with the results saved to a database 110 in the storage device 15.

The apparatus of this invention wherein the computing system 12 uses the thickness 102 to calculate and output the average stress through the transparent sheet 11.

The apparatus of this invention wherein the computing system 12 simultaneously calculates 105 iridescence, retardance, residual stress, shear and reflected optical lens power of the transparent sheet 11 and displays on the display device 14 results 111 including optical distortion and physical topography.

The apparatus of this invention wherein the computing system 12 is provided with a method from the storage device 15 to define a list of quality control specifications 107 or to select a list of quality control specifications 107 from an existing library from the storage device 15, and which displays on the display device 14 a notification, a warning and or a failure notice for parts that exceed specified measurements.

The apparatus of this invention wherein a list of specific instructions for machine control 112 from the storage device 15 is displayed to the display device 14 based on failing a single or plurality of quality control specification.

The apparatus of this invention further comprising a list of specific machine controls 112 from the storage device 15 which are to be initiated via software in the computing system 12 based on failing a single or plurality of quality control specifications 107.

The apparatus of this invention further comprising a system for storing in the storage device 15 measurement results 106 associated with specific parts.

The apparatus of this invention further comprising a system for generating reports 110 from the storage device 15 on the measurement results 106 of specific parts, transparent sheets 11.

The apparatus of this invention further comprising a system for sending from the storage device 15 the measurement results 106 to, and automated adjustment (machine control 112) of, the fabrication or heat treatment machinery upstream of the inspection process.

This invention also describes a method of using an apparatus in inspecting, analyzing, classifying, and/or grading quality of a transparent sheet 11 comprising: providing a data set of photoelastic measurements 101 which may include any or all of: optical retardance, shear, stress axis orientation, stress map and/or maximum predicted iridescence over the area of the transparent sheet 11; providing a thickness 102 of the transparent sheet 11; providing a computing system 12, a display device 14 and a storage device 15; retrieving the data set of optical measurements 191 of the transparent sheet 11 from the storage device 15; defining, saving and retrieving a list of segmentation specifications 103 or selecting the list of segmentation specifications 103 from an existing library, with each segmentation specification 103 defining a method for segmenting the data set of photoelasticity measurements 101 spatially into a plurality of discrete segments (See FIGS. 2-9); defining, saving and retrieving a list of measurement specifications 104 or selecting the list of measurement specifications 104 from an existing library where each measurement specification 104 is a mathematical function applied to single or plurality of segments; computing and outputting measurement results 106 to the display device 14 including a maximum potential iridescence, a retardation and a residual stress over a full area of the transparent sheet 11 using the data set of optical measurements 101, the thickness of the transparent sheet 102, the segmentation specifications 103 and the measurement specifications 104.

The method of using an apparatus, further comprising defining a list of quality control specifications 107 or selecting the list of quality control specifications 107 from an existing library, and triggering notification, warning and or failure notices for transparent sheets that exceed specified measurements.

The method of using an apparatus, further comprising displaying a list of specific instructions to the operator 111 based on failing a single or plurality of quality control specifications 107.

The method of using an apparatus, further comprising initiating a list of specific machine controls 112 via software based on failing a single or plurality of quality control specifications 108.

The method of using an apparatus, further comprising storing the results measurements 106 associated with specific transparent sheets 11.

The method of using an apparatus, further comprising generating reports 110 on the measurement results 106 of specific transparent sheets 11.

The method of using an apparatus, further comprising sending measurement results 106 for machine control 112 to the fabrication or heat treatment machinery upstream of the inspection process and adjusting the fabrication or heat treatment machinery upstream of the inspection process (see T, direction of travel, FIG. 1) based on the measurement results 106

The foregoing discussion discloses and describes merely exemplary embodiments of the present invention. The invention is not limited to the method and the object as described in detail above. Upon review of the specification, one skilled in the art will readily recognize from such discussion, and from the accompanying drawings and claims, that various changes, modifications and variations can be made therein without departing from the spirit and scope of the invention as defined in the following claims.

What is claimed is:

1. A method of inspecting, analyzing, classifying, and/or grading quality of a transparent sheet comprising:
    providing a data set of photoelasticity measurements of the transparent sheet, comprising a magnitude of optical retardance, an axis orientation of optical retardance, a magnitude of residual stress, an axis orientation of residual stress, and underlying orthogonal shear components;
    defining segmentation specifications of the transparent sheet, with each segmentation specification segmenting spatially the data set of photoelasticity measurements into a plurality of discrete segments;
    defining measurement specifications of the transparent sheet, with each measurement specification applying a mathematical, statistical or logical operation upon a single or plurality of discrete segments;
    defining quality control specifications of the transparent sheet, with each quality control specification defining a test limit applying to a single photoelasticity measurement or a plurality of photoelasticity measurements and defining a specified action depending on the test limit;
    calculating a results measurement by combining a segmentation specification and a measurement specification;
    applying a quality control test limit on the results measurement using a quality control specification resulting in a quality control test result; and
    performing the specified action depending upon the quality control test result.

2. The method of claim 1 wherein defining a list of segmentation specifications includes selecting the list of segmentation specifications from an existing library of segmentation specifications, defining a list of measurement specifications includes selecting the list of measurement specifications from an existing library of measurement specifications and defining a list of quality control specifications includes selecting the list of quality control specifications from an existing library of quality control specifications.

3. The method of claim 2, further comprising providing a thickness measurement obtained from a thickness sensor;
    wherein calculating the results measurement further includes the thickness measurement; and
    wherein applying the quality control test limit further includes the thickness measurement.

4. The method of claim 2, wherein the quality control specifications include Boolean logic functions such as "and", "or" "not-or" or "exclusive or".

5. The method of claim 2, wherein the data set of photoelasticity measurements and a segmentation specification C and a measurement specification M2 allows predicting a magnitude of deformation from planar of the transparent sheet.

6. The method of claim 2, wherein using orthogonal shear components allows predicting the magnitude of deformation from planar in the transparent sheet.

7. The method of claim 2, further defining the segmentation specification of the transparent sheet into four discrete segments, or quadrants, allowing predicting the magnitude of deformation from planar in the transparent sheet.

8. The method of claim 2, utilizing the data set of photoelasticity measurements in predicting the magnitude of defects including haze in the transparent sheet.

9. The method of claim 2, utilizing the axis orientation of optical retardance in predicting a magnitude of defects including haze in the transparent sheet.

10. The method of claim 2, using the orthogonal shear components in predicting the magnitude of deformation including haze or strain patterns or iridescence in the transparent sheet.

11. The method of claim 2, further defining the segmentation specification of the transparent sheet into a sample center and outer areas and using this segmentation in predicting the magnitude of defects, including haze, in the transparent sheet.

12. The method of claim 2, wherein performing the specified action includes removing the transparent sheet from a production stream and adjusting process parameters.

13. An apparatus for inspecting, analyzing, classifying, and/or quality grading of a transparent sheet comprising:
    a data set of photoelasticity measurements selected from the group consisting of any or all of the following: optical retardance magnitude and orientation, the orthogonal shear components typically referred to as Shear 0 and Shear 45, stress axis orientation, stress map and maximum predicted iridescence;
    a computing system;
    a thickness sensor connected to the computing system, and measuring and outputting a thickness of the transparent sheet to the computing system;
    a display device connected to the computing system; and
    a storage device connected to the computing system,
    wherein the computing system uses the data set of photoelasticity measurements, and the thickness of the transparent sheet from the thickness sensor to calculate and output to the display device a maximum potential iridescence, a retardation and a residual stress over a full area of the transparent sheet.

14. A method of using an apparatus in inspecting, analyzing, classifying, and/or grading quality of a transparent sheet comprising:
    providing a data set of optical measurements which may include any or all of: optical retardance, shear, stress axis orientation, stress map and/or maximum predicted iridescence over the area of the transparent sheet;
    providing a thickness of the transparent sheet;
    providing a computing system, a display device and a storage device;
    retrieving the data set of optical measurements of the transparent sheet from the storage device ;

retrieving the thickness of the transparent sheet from the storage device;

defining, saving and retrieving a list of arbitrary segmentation specifications or selecting the list of arbitrary segmentation specifications from an existing library, with each segmentation specification defining a method for segmenting the data set of photoelasticity measurements spatially into a plurality of discrete segments;

defining, saving and retrieving a list of arbitrary measurement specifications or selecting the list of arbitrary measurement specifications from an existing library where each measurement specification is a mathematical function applied to single or plurality of segments;

computing and outputting to the display device a maximum potential iridescence, a retardation and a residual stress over a full area of the transparent sheet using the data set of optical measurements, the thickness of the transparent sheet, the arbitrary segmentation specifications and the arbitrary measurement specifications.

* * * * *